Nov. 9, 1948.　　　　T. I. DUFFY　　　　2,453,363
BRAKE FOR WAGONS
Filed Feb. 28, 1945　　　　　　　　　　　　4 Sheets—Sheet 1
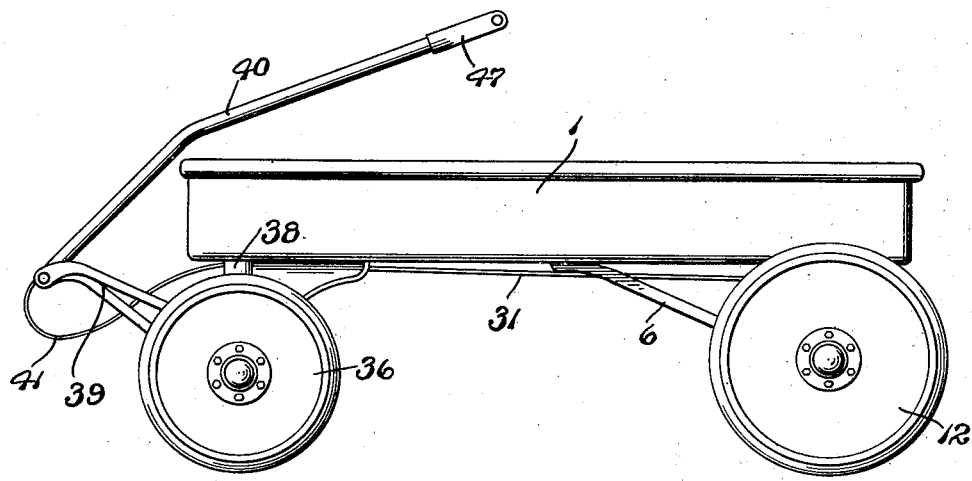
Fig. 1.
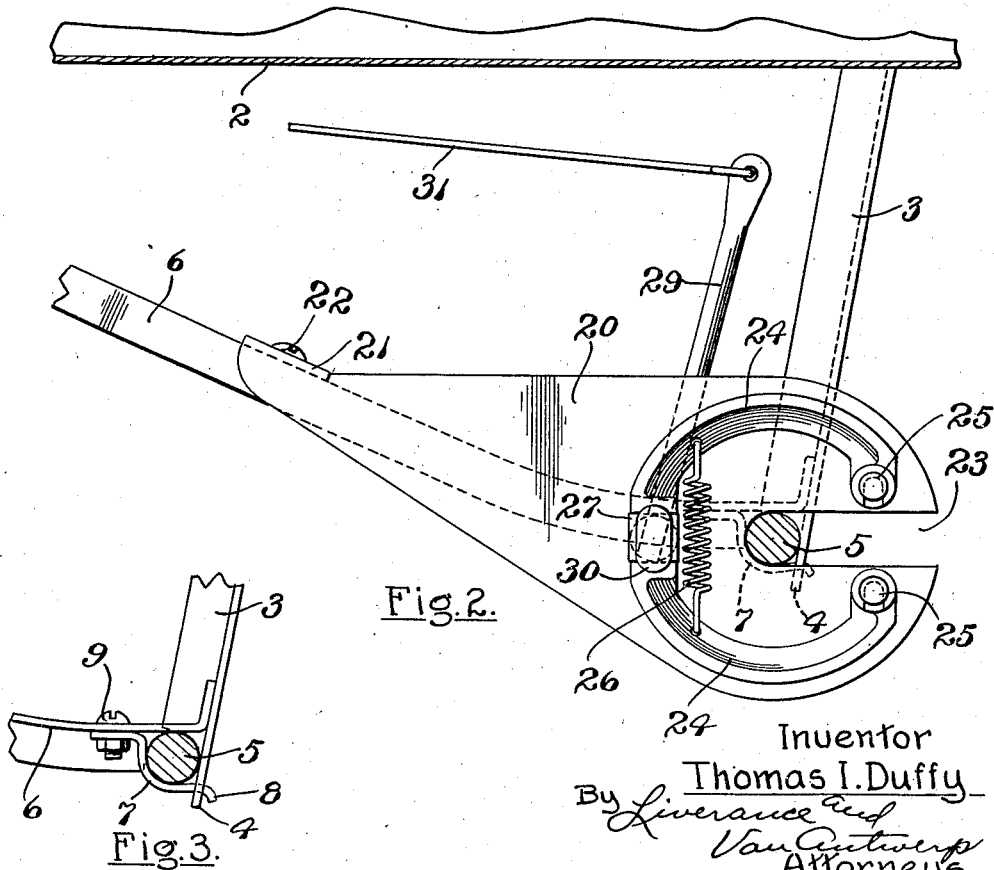
Fig. 2.
Fig. 3.
Inventor
Thomas I. Duffy
By Liverance and
Van Antwerp
Attorneys Inventor
Thomas I. Duffy
By *Liverance and Van Antwerp*
Attorneys Inventor
Thomas I. Duffy
By Liverance and Van Antwerp
Attorneys Patented Nov. 9, 1948

2,453,363

UNITED STATES PATENT OFFICE 2,453,363

BRAKE FOR WAGONS

Thomas I. Duffy, Grand Haven, Mich., assignor to Anderson-Bolling Mfg. Co., Grand Haven, Mich., a corporation of Michigan Application February 28, 1945, Serial No. 580,139

5 Claims. (Cl. 188—2)

1

This invention relates primarily to a novel and readily applied brake structure to the rear wheels of wagons, preferably of the class which is known as express wagons, largely used by children.

It is an object and purpose of the present invention to provide a wagon of the type noted which is complete without brakes and may be sold without them and which may, at any time, before or after sale, have readily applied thereto the brake construction which I have provided. The wagon structure by itself may be fully and completely assembled and be in use and the brake addition thereto readily applied when wanted. Or, of course, the wagon may be initially supplied with the brake construction and sold with it so applied.

To these ends, and to others which will appear as an understanding of the invention is had, I have made a construction embodying the invention as disclosed in the following description and the drawings accompanying it, in which drawings, Fig. 1 is a side elevation of the wagon having my invention applied thereto.

Fig. 2 is a side elevation partly in section and with wheels removed illustrating the immediate brake assembly, one applicable to each rear wheel.

Fig. 3 is a fragmentary transverse section and elevation at the rear lower corner of the wagon showing the manner of detachably connecting the rear axle to the body.

Like reference characters refer to like parts in the different figures of the drawings.

Figure 5:
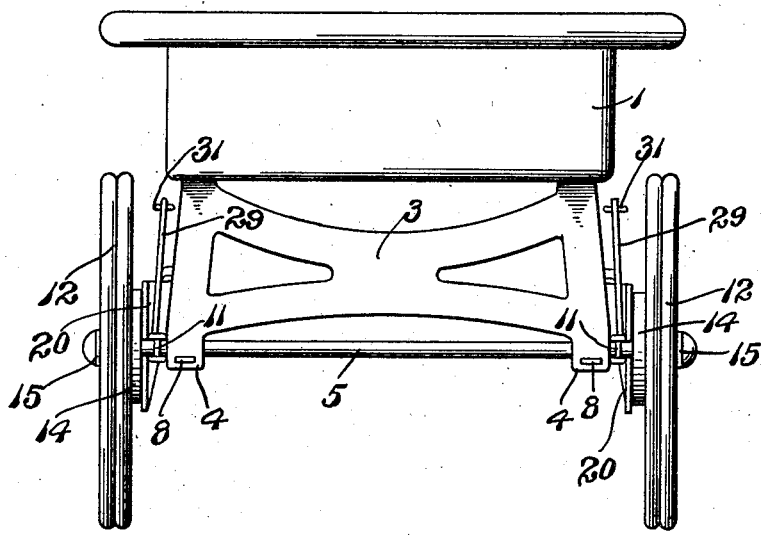
Fig. 5 is a rear end view of the wagon having my invention thereon.

The wagon body 1, preferably made of steel, has a horizontal bottom 2. Adjacent the rear end of the body, a support 3 of the form best shown in Fig. 5, and connected at its upper end in any suitable manner to the bottom 2 of the body, extends downwardly and preferably slightly in a forward direction. At each lower corner it has a downwardly extending foot 4, the sides of the support 3 having forwardly extending flanges 4a below the lower ends of which said parts 4 extend.

The horizontal rear axle 5 of the wagon is located against the front sides of the parts 4 and below forwardly and upwardly extending braces 6, one adjacent each side of the wagon. The braces 6 at their front ends are welded or otherwise permanently secured to the bottom 2 and at their rear ends to the member 3. Securing clips 7 are provided at their rear ends with narrow projections 8 passing through openings in the parts 4 below the axle 5, and are curved to fit against said axle and terminate in front ends lying against the under side of the braces 6, to which they are detachably secured by means of screws or bolts 9 (Fig. 3). In practice U-shaped members 10 are located one at each end of the member 3 and on said axle 5, with connecting pins 11 between the free ends of the members 10, which are clamped against the axle and hold said axle and its support 3 against relative movement.

Figure 6:
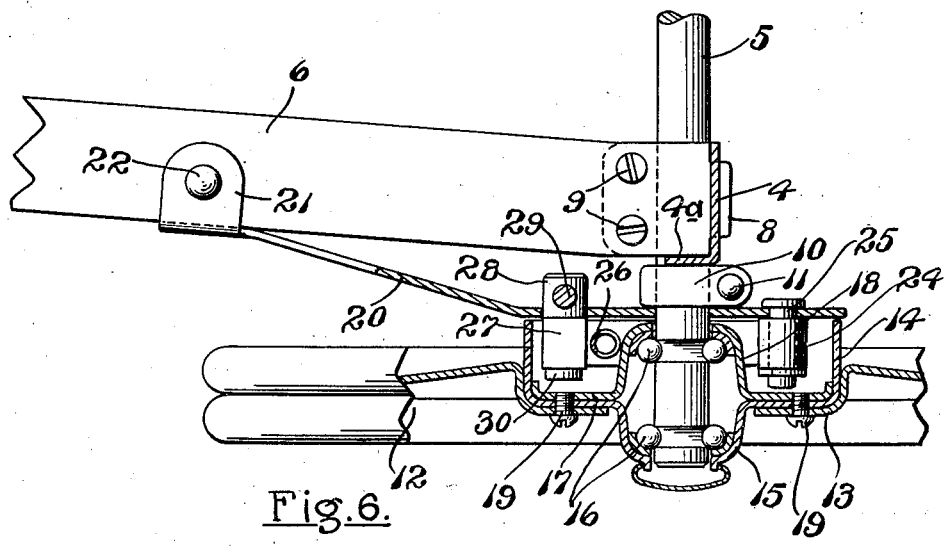
Fig. 6 is a fragmentary plan and horizontal section through a rear wheel and the brake assembly unit, one of which is associated with each rear wheel.

Wheels 12 are mounted at the ends of the axles. Said wheels are of sheet metal with suitable tires thereon and at their central portions are each pressed outwardly into a cup 13, having a central opening therethrough (Fig. 6). At the inner side of said cup a combined brake drum and hub member is seated, the brake drum being shown at 14, and from the center of which the hub extension 15 passes outwardly through the opening in the cup 13. An antifriction roller bearing 16 is disposed within the hub section 15 and the axle 5. The wheel is completed by an inner plate 17 located within and against the bottom of the brake drum and having a central inwardly extending hub portion 18, directly opposite the hub section 15, with a second anti-friction roller bearing 16 located within said hub portion 18 and around the axle. The parts are detachably secured together by means of screws 19 (Fig. 6). Such wheel without any brakes for engagement against the inner sides of the flanges of the drums 14 may be secured to the axles 5 for supporting the rear end of the wagon body above the ground.

The brake unit adapted to be associated with and applied to the drum 14 of each wheel includes a plate 20 of sheet metal which, at its forward end and at its upper side, has an inturned ear 21 to lie over the upper side of its associated brace 6 to which it may be connected by means of a screw 22 (Figs. 2 and 6). At its rear portion, the plate 20 is enlarged to cover the open inner side of the drum 14. It is provided with a longitudinal slot 23 (Fig. 2) so that it may be readily passed over the axle 5. At the outer side of the plate 20 upper and lower brake shoes 24 are mounted at their rear ends on pivots 25 extending from the plate 20, one above and the other below the slot 23. The brake shoes 24 at their front end portions are connected by a coiled tension spring 26, the normal operation of which is to draw the front free ends of the shoes toward each other. Between the front free ends of the brake shoes a bar 27, square in cross section, is located which, at its inner end, is machined to cylindrical shape providing a projection 28 which passes through the plate 20 and has an upwardly extending rod 29 connected therewith at the lower end of the rod. At the inner end of the bar 27 a flat member 30 is secured normally located vertically, as in Fig. 2, and at its ends lying against the inner sides of the free ends of the shoes. It is evident that on turning movement to the rods 29 in a forward direction at their upper ends, the square bars 27 will force the shoes 24 outwardly against the inner sides of the brake drum flanges 14 with a frictional engagement which will act the wheels to tend to stop their turning.

Figure 4:
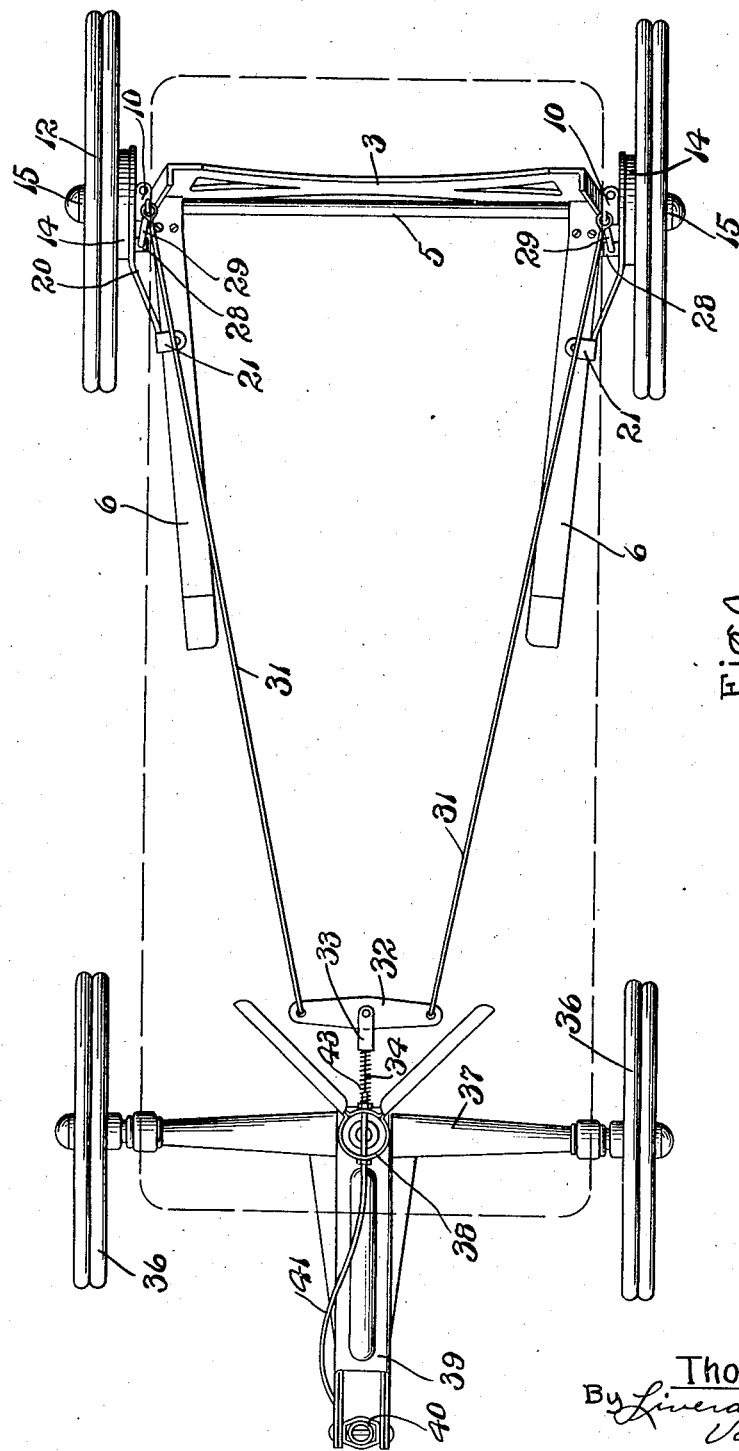
Fig. 4 is a plan view of the body running gear, the position of the body with respect thereto being indicated in dash lines.
Figure 7:
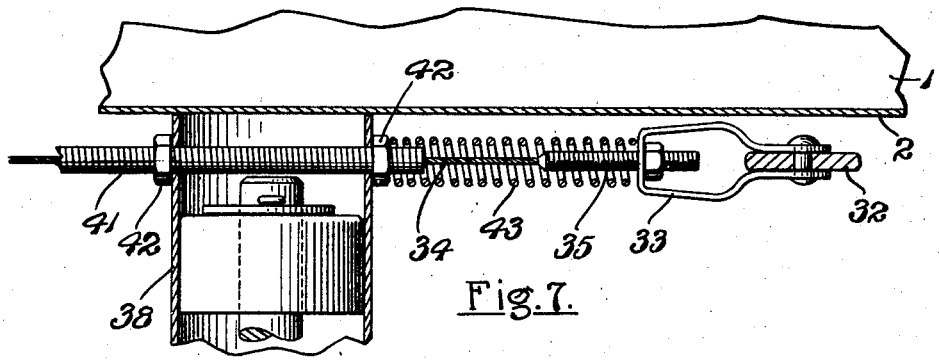
Fig. 7 is a fragmentary vertical longitudinal section through the front end of the body showing the mounting of the manual means used for setting the brakes.
Figure 8:
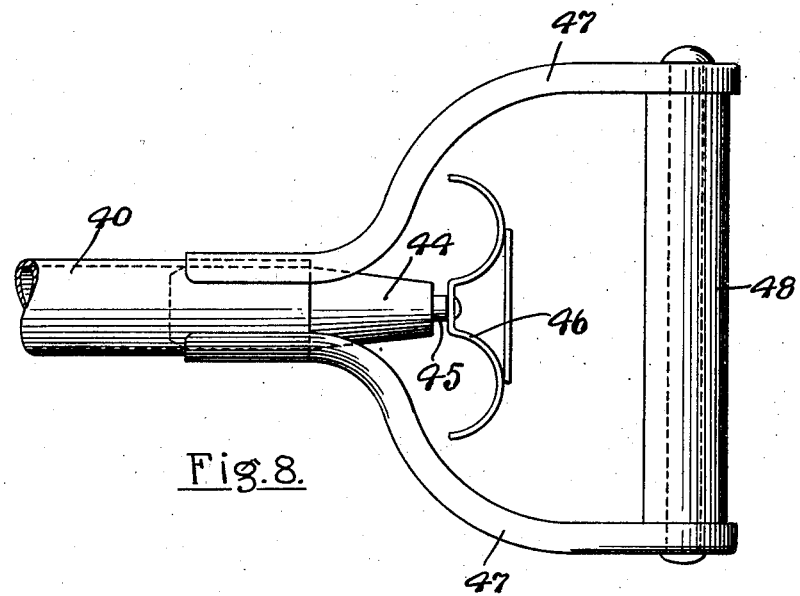
Fig. 8 is an enlarged plan of the front end of the tongue of the wagon showing the means which may be engaged by the fingers to set the brakes.

Each of the rods 29 at its upper end has a line or cable 31 connected thereto, the two cables extending forwardly (Fig. 4) and being connected at their forward ends to an equalizer bar 32 pivotally connected midway between its ends to a clevis 33 (Fig. 7). A wire 34 at its rear end is provided with a threaded rod 35 which passes through the front end of the clevis to receive a nut, as shown in Fig. 7, to connect the wire with the clevis.

The front wheels 36 supporting the wagon body are mounted at the ends of an axle associated with a bolster 37 which is turnable about a vertical axis. The specific structure of said bolster and the construction by means of which it is turned about its axis is no part of the present invention, being disclosed in a companion application for patent, Serial No. 580,140, filed of even date herewith and now Patent No. 2,418,971, issued April 15, 1947. In such structure a vertical bracket support is connected to the bottom 2 of the wagon body and has a substantially cylindrical forward portion indicated at 38. The tongue structure generally indicated at 39 (Fig. 1) and with a tongue 40 pivotally connected thereto is likewise fully described in said companion application. The tongue 40 is a hollow tube and lengthwise of it the surrounding sheath 41 of the wire 34 passing lengthwise therethrough is located, passing therefrom at its lower end and thence carried through front and rear oppositely disposed openings in the bracket 38 with nuts 42 for locating and securing said sheath (Fig. 7). A coiled compression spring 43 has one end bearing against the forward end of the clevis 33, surrounds the rear end of the wire 34 and a part of the rod 35, and at its front end is seated against the rear nut 42.

Figure 9:
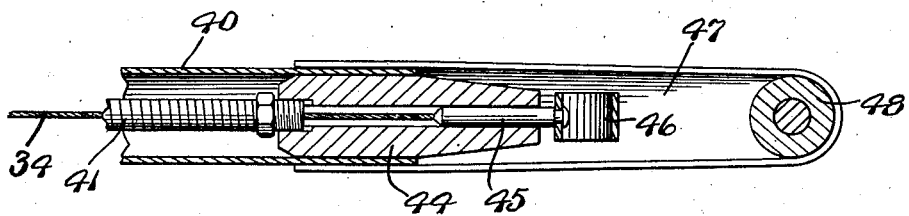
Fig. 9 is a fragmentary longitudinal section through the front end of said handle.

In the upper end of the tubular tongue member 40 a plug 44, which may be of wood, is located with a press fit and projects beyond the tube 44. At its end within the tube, it receives the front end of the sheath 41 and it has a longitudinal opening therethrough for passage of the wire 34 which, at its outer end, is connected with a rod 45 (Fig. 9) guided in the opening through the block 44 and extending therebeyond.

A finger grip 46 is permanently secured to the projecting end of the rod 45. The handle of the tongue comprises two sides 47, secured at opposite sides of the tube 40 and extending therefrom to either side of the finger grip 46, and with the usual cylindrical cross member 48 between the opposite ends of the sides 47.

As is evident, the wagon may be made and sold without applying the brake units to the rear wheels and without the operating means for moving the brake shoes into frictional engagement with their respective drums 14. It is further evident that either before or after sale of the wagon the brake units and their operating means may be installed. In the installation after a wagon has been assembled and may have been sold and is in use, the shaft 5 with wheels 12 may be removed by releasing the holding clips 7. The brake units, consisting of the plate 20 and the shoes carried thereby may be installed with said shoes within their respective drums, the axle reconnected and the ears at 21 screw connected to the braces 6; while the operating means therefor, consisting of cables 31, equalizing bar 32 and the parts connected therewith, is readily installed by passing the sheath 41 with the wire 34 therein downwardly through the tube 40 and thence through the openings in the cylindrical member 38, forcing plug 44 into a driving fit with the upper end of the tube, and connecting the clevis 34 place to the rod 35 and joining the ends of the cables 31 to the upper ends of the rod 29 and the ends of the equalizing bar. The force of spring 43 may be adjusted by adjustment of the nut on rod 35 and at the same time a proper adjustment of the cables 31 obtained, so that an outward movement imparted by engaging the member 48 of the handle and the finger member 46 will force the brake shoes into operative braking engagement with the drums 14.

The construction is relatively simple and economical to produce, easily installed and is sure in operation.

The invention is defined in the appended claims and is to be considered comprehensive of all forms of structure coming within their scope.

I claim:

1. In a wagon construction, a body, a horizontal rear axle located below and transversely of the body, supporting means at the lower end of which said axle is carried and the upper end of which is secured to the bottom of the body, a wheel at each end of the axle rotatably mounted thereon, a brake drum at the inner side of each wheel, a brace connected to the lower end of the support, one at each side thereof, extending forwardly and upwardly to and secured to the under side of said body, a plate connected to each brace and extending rearwardly across the open inner side of its associated brake drum, said plate being horizontally slotted from its rear end inwardly a distance for the passage of said axle, brake shoes movably mounted one above and one below the slot on each of said plates, said brake shoes on a plate entering an associated brake drum, means normally tending to move said brake shoes toward each other, and means pivotally mounted on each plate and operatively connected with said brake shoes for moving them into friction engagement with their associated drums.

2. A construction as defined in claim 1, said brake shoes at their rear ends being pivotally mounted for movement one above and one below the slot of the associated plate, and the means for moving said shoes outwardly comprising, a non-circular bar having a cylindrical projection extending through to the inner side of the plate, said bar being disposed between the free ends of the brake shoes, and a rod connected to said projection at the inner side of the plate and extending upwardly therefrom, swinging movment of said rod in a forward direction turning said bar to move the brake shoes about their pivots outwardly away from each other.

3. A construction as defined in claim 1, said brake shoes being pivotally mounted for movement about pivots located at the rear ends thereof, one above and one below the slot in each plate, a bar rectangular in cross section located at the outer side of each plate and having a cylindrical projection extending through the plate to its inner side, said bar being disposed between the free ends of said brake shoes, a rod secured to each of said projections and extending upwardly therefrom, cables connected one to the upper end of each of said rods and extending forwardly, an equalizing bar pivotally mounted midway between its ends to which the front ends of said cables are connected and manual means for drawing said equalizing bar in a forward direction to simultaneously turn said rods in a forward direction to move the brake shoes simultaneously outward.

4. In a wagon, a body, a rear axle with wheels thereon located below, connected to and extending transversely of the rear portion of the body, a brake drum on each wheel, a brake associated with each brake drum and attached wheels, manually operable means associated with said brakes for operating them to frictionally engage the drums including, a cable to be forwardly pulled connected at its rear end with each of said brakes, an equalizing bar to the ends of which said cables are connected at their front ends, a clevis pivotally connected to and extending forwardly from the equalizing bar midway between its ends, an elongated flexible tubular sheath anchored at its rear portion in fixed relation to said body, a hollow tongue having a handle at its front end through which the sheath passes and to which its forward end is secured, a wire connected to said clevis passing through said sheath and to said handle, and means at the free end of the wire for manual engagement to pull thereon, as specified.

5. A wagon having an axle and an axle support, wheels on said axle, a brake drum on one of the said wheels, a supporting member detachably connected to said axle and axle support, brake shoes engageable with said brake drum, and brake shoe operating mechanism, both mounted on said supporting member and detachable from said axle and axle support therewith, said supporting member being provided with a slot to receive said axle and detachable means for fastening the support member to the axle support.

THOMAS I. DUFFY.

REFERENCES CITED

The following references are of record in the file of this patent:

UNITED STATES PATENTS

| Number | Name | Date |
|---|---|---|
| 809,912 | Ferris | Jan. 9, 1906 |
| 824,215 | Snyder | June 26, 1906 |
| 1,426,753 | Macpherson | Aug. 22, 1922 |
| 1,501,589 | Ferris | July 15, 1924 |
| 1,536,768 | Casler | May 5, 1925 |
| 1,551,640 | Butler | Sept. 1, 1925 |
| 1,598,174 | Tarlton et al. | Aug. 31, 1926 |
| 1,628,559 | Showers | May 10, 1927 |
| 1,763,096 | Franklin | June 10, 1930 |
| 1,959,229 | Carter | May 15, 1934 |
| 2,195,558 | Bowen | Apr. 2, 1940 |

FOREIGN PATENTS

| Number | Country | Date |
|---|---|---|
| 91,446 | Switzerland | Nov. 1, 1921 |
| 693,262 | France | Aug. 19, 1930 |